US008793607B2

(12) United States Patent
Jeong et al.

(10) Patent No.: US 8,793,607 B2
(45) Date of Patent: Jul. 29, 2014

(54) METHOD FOR REMOVING ICON IN MOBILE TERMINAL AND MOBILE TERMINAL USING THE SAME

(75) Inventors: Kyesook Jeong, Seoul (KR); Inyoung Hwang, Seoul (KR); Meeyeon Choi, Seoul (KR); Jungseok Hong, Seoul (KR); Hyunsuk Jung, Seoul (KR); Byoungnam Lee, Seoul (KR); Kyueun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 509 days.

(21) Appl. No.: 12/900,408

(22) Filed: Oct. 7, 2010

(65) Prior Publication Data

US 2011/0087981 A1 Apr. 14, 2011

(30) Foreign Application Priority Data

Oct. 9, 2009 (KR) .................. 10-2009-0096047

(51) Int. Cl.
G06F 3/00 (2006.01)
G06F 9/00 (2006.01)
G06F 17/00 (2006.01)
(52) U.S. Cl.
USPC ............ 715/769; 715/762; 715/765; 715/763
(58) Field of Classification Search
USPC ......... 715/762, 763, 764, 765, 863, 864, 865, 715/866
See application file for complete search history.

(56) References Cited

U.S. PATENT DOCUMENTS

| 5,710,894 | A * | 1/1998 | Maulsby et al. | 715/763 |
| 7,325,199 | B1 * | 1/2008 | Reid | 715/723 |
| 7,444,593 | B1 * | 10/2008 | Reid | 715/723 |
| 2006/0288044 | A1 * | 12/2006 | Kashiwagi et al. | 707/200 |
| 2007/0101297 | A1 * | 5/2007 | Forstall et al. | 715/841 |
| 2008/0122796 | A1 * | 5/2008 | Jobs et al. | 345/173 |
| 2008/0174570 | A1 * | 7/2008 | Jobs et al. | 345/173 |
| 2008/0313568 | A1 * | 12/2008 | Park et al. | 715/835 |

FOREIGN PATENT DOCUMENTS

| CN | 1694056 | 11/2005 |
| CN | 1707479 | 12/2005 |
| CN | 1920762 | 2/2007 |

OTHER PUBLICATIONS

IBM Technical Disclosure Bulletin, Nov. 1994, US.*
In the Intellectual Property Office of China Application No. 201010548943.X, Office Action dated Oct. 25, 2012, 8 pages.
The State Intellectual Property Office of the People's Republic of China Application No. 201010548943.X, Office Action dated Apr. 16, 2013, 8 pages.

* cited by examiner

Primary Examiner — Tadeese Hailu
Assistant Examiner — Anita D Chaudhuri
(74) Attorney, Agent, or Firm — Lee, Hong, Degerman, Kang & Waimey

(57) ABSTRACT

A method for removing an icon in a mobile terminal is presented. The method includes, displaying an icon display area and a menu area on a display screen of the mobile terminal, wherein the icon is displayed in the icon display area and a predetermined executing icon menu is displayed in the menu area, selecting the icon, modifying the menu displayed in the menu area to a removing menu when a preliminary removing signal is input on the selected icon, and removing the selected icon in response to the movement of the selected icon to a predetermined area of the removing area.

19 Claims, 18 Drawing Sheets

METHOD FOR REMOVING ICON IN MOBILE TERMINAL AND MOBILE TERMINAL USING THE SAME

CROSS-REFERENCE TO RELATED APPLICATION

Pursuant to 35 U.S.C. §119(a), this application claims the benefit of earlier filing date and right of priority to Korean Patent Application No. 10-2009-0096047, filed on Oct. 9, 2009, the contents of which are hereby incorporated by reference herein in their entirety.

BACKGROUND OF THE INVENTION

1. Field of the Invention

The present disclosure relates to a method for removing an icon displayed on a mobile terminal, and a mobile terminal using the same.

2. Discussion of the Related Art

Generally, terminals can be classified into mobile terminals and stationary terminals. The mobile terminals can be further classified into handheld terminals and vehicle mount terminals according to the terminals' portability.

Terminals may be implemented as multimedia players provided with composite functions such as capturing still and moving images, playback of music, game play, broadcast reception, and the like.

Improvements to hardware and software of the terminals may be considered in order to increase the functionality of a terminal.

Furthermore, the increased diversification of a UI (User Interface) of a terminal requires for the selection, execution, and removal of various menus on the terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to one embodiment, a method for removing an icon in a mobile terminal is presented. The method includes displaying an icon display area and a menu area on a display screen of the mobile terminal, wherein the icon is displayed in the icon display area and a predetermined executing icon menu is displayed in the menu area, selecting the icon, modifying the menu displayed in the menu area to a removing menu when a preliminary removing signal is input on the selected icon, and removing the selected icon in response to the movement of the selected icon to a predetermined area of the removing area.

According to one feature, the method also includes displaying a first wallpaper in the icon display area. Furthermore, wherein the preliminary removing signal is a touch and drag input.

According to another feature, a plurality of files associated with a folder are displayed when the icon is a folder and the folder is placed within the predetermined vicinity of the removing area.

According to yet another feature, the method also includes setting at least a second wallpaper or a third wallpaper in a virtual space adjacent to the first wallpaper and changing the first wallpaper to the second wallpaper or third wallpaper in response to a wallpaper changing signal. Furthermore, the removing area comprises a temporary removing area and a permanent removing area.

According to still yet another feature, the method includes displaying a list of temporarily removed icons when the temporary removing area is selected, and restoring a removed icon selected from the list of temporarily removed icons on a currently displayed wallpaper if a restoring command is selected for the removed icon.

According to another embodiment, a mobile terminal comprising a method for removing an icon is presented. The mobile terminal includes a touch screen configured to display an icon display area and a menu area, wherein the icon is displayed in the icon display area and an executing icon is displayed in the menu area and a controller configured to modify the menu area to a removing area if a predetermined removing signal is input on an icon selected from the icon display area.

According to yet another embodiment, a method for executing a function associated with an icon in a mobile terminal is presented. The method includes displaying at least one icon in an icon display area and a menu in a menu area on a touch screen of the mobile terminal, selecting an icon from the at least one icon displayed in the icon display area, modifying the menu displayed in the menu area to at least one application icon associated with an application which may execute a function associated with the selected icon, and executing the function associated with the selected icon when the selected icon is placed over an application icon from the at least one application icon displayed in the menu area.

According to still yet another embodiment, a method for executing a function associated with an icon in a mobile terminal is presented. The method includes, displaying at least one icon in an icon display area and a menu in a menu area on a touch screen of the mobile terminal, selecting an icon from the at least one icon displayed in the icon display area, modifying at least a shape, size, or color of the selected icon, modifying the menu displayed in the menu area to a removing menu when a preliminary removing signal is input on the selected icon, and displaying information associated with the selected icon when the selected icon is placed to within a predetermined vicinity of the removing menu.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE PREFERRED EMBODIMENTS

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, mobile phones, user equipment, smart phones, DTV, computers, digital broadcast terminals, personal digital assistants, portable multimedia players (PMP) and/or navigators.

Descriptions may be provided below with regard to a mobile terminal. However, such teachings may apply equally to other types of terminals.

Figure 1:
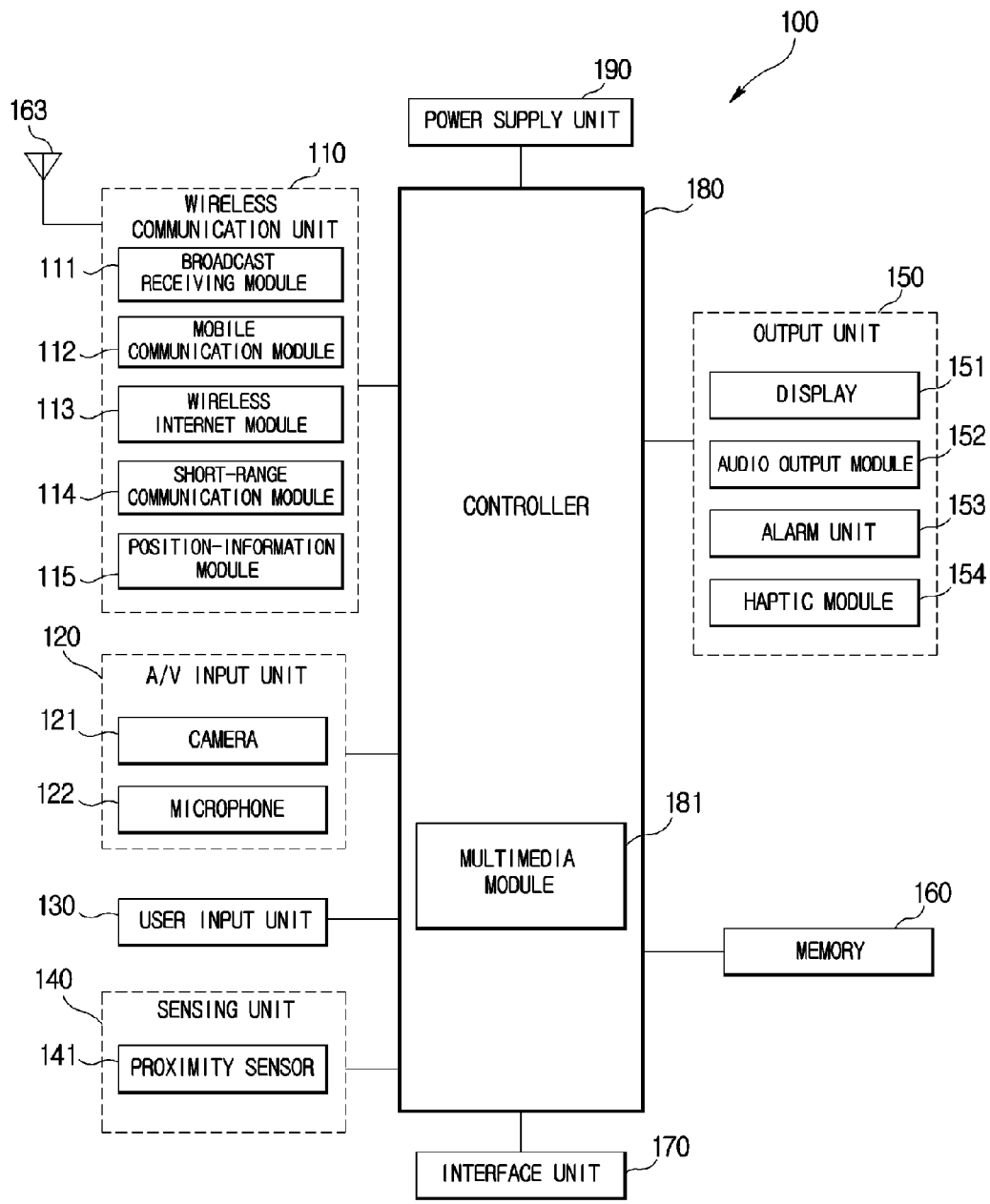
FIG. 1 is a block diagram of a mobile terminal in accordance with an embodiment of the present invention.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wired communication unit. The wireless communication unit 110 and the wired communication unit may be commonly referred to as a communication unit.

Examples of broadcast associated information may include information associated with a broadcast channel, a broadcast program, a broadcast service provider, etc. For example, broadcast associated information may include an electronic program guide (EPG) of a digital multimedia broadcasting (DMB) system and an electronic service guide (ESG) of a digital video broadcast-handheld (DVB-H) system.

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include a digital multimedia broadcasting-terrestrial (DMB-T) system, a digital multimedia broadcasting-satellite (DMB-S) system, a digital video broadcast-handheld (DVB-H) system, a data broadcasting system known as media forward link only (MediaFLO®) and an integrated services digital broadcast-terrestrial (ISDB-T) system. Reception of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wired Internet module in non-mobile terminals. The wireless Internet module 113 and the wired Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current three-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular, the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100. The sensing unit 140 may also comprise a proximity sensor 141.

The mobile terminal 100 may be configured as a slide-type mobile terminal. In such a configuration, the sensing unit 140 may sense whether a sliding portion of the mobile terminal 100 is opened or closed. The sensing unit 140 may also sense presence or absence of power provided by the power supply 190, presence or absence of a coupling or other connection between the interface unit 170 and an external device, etc.

The output unit 150 may generate an output relevant to a visual sense, an auditory sense, a tactile sense and/or the like. The output unit 150 may include a display 151, an audio output module 152, an alarm 153, a haptic module 154, and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a three-dimensional (3D) display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wired/wireless headset port, an external charger port, a wired/wireless data port, a memory card port, a port for coupling to a device having an identity module, an audio input/output (I/O) port, a video input/output (I/O) port, an earphone port and/or the like.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character and/or recognizing a picture drawing input performed on the touchscreen as an image. Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
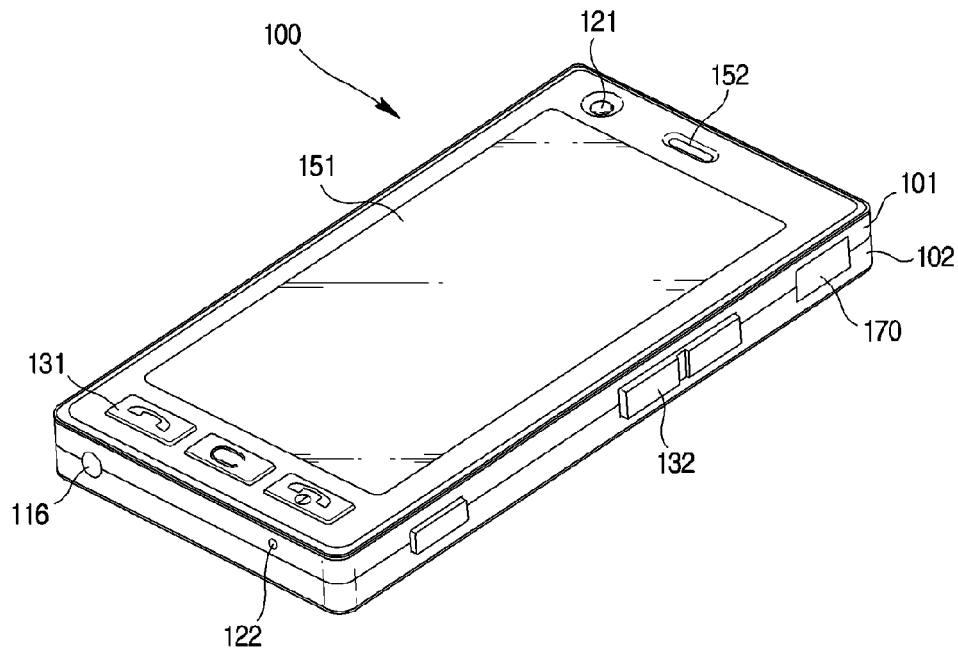
FIGS. 2A and 2B are a perspective view of a mobile terminal according to an embodiment of the present invention.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of a metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content input by the first manipulating unit 131 or the second manipulating unit 132 may be diversely set. For example, a command such as start, end, scroll, or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
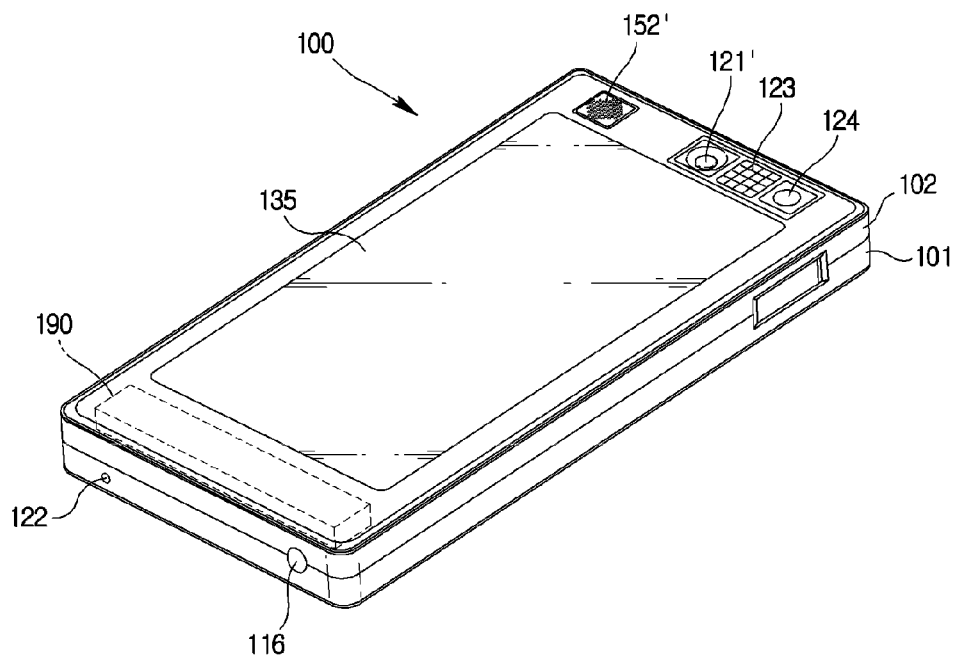

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of a user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured as a light-transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

In the following description, a method for removing an icon in a mobile terminal and a method for restoring the removed icon according to the method for removing the icon will be explained, referring to FIGS. 3 and 4.

Figure 3:
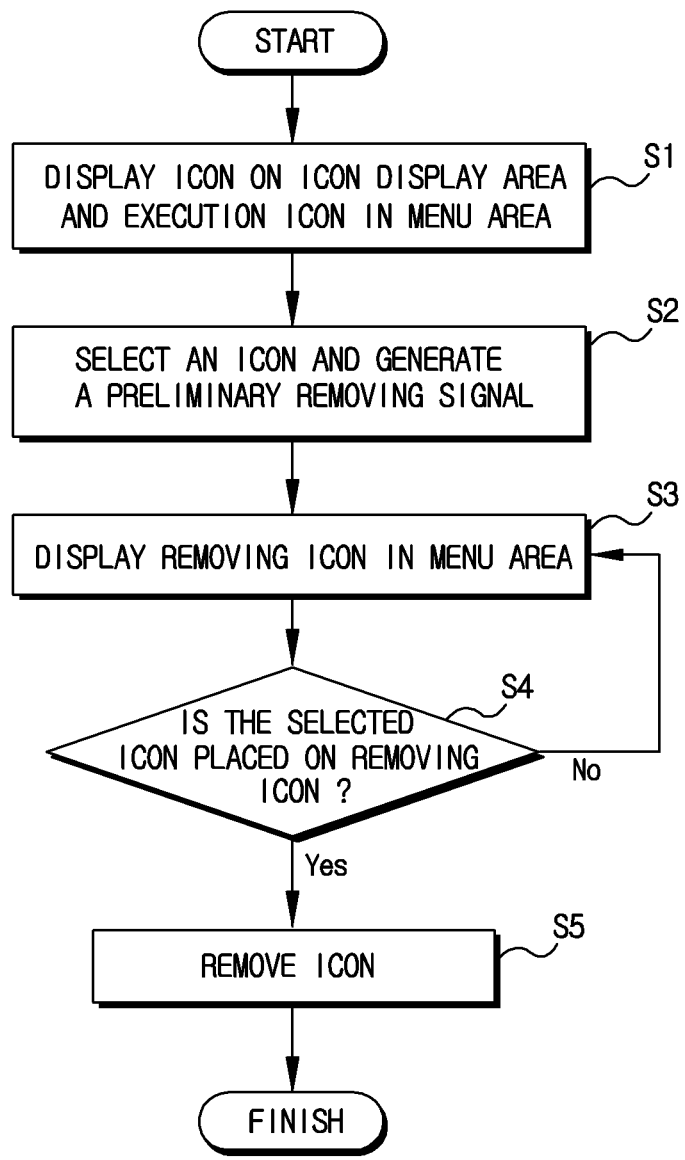
FIG. 3 is a flowchart for removing an icon in a mobile terminal according to an embodiment of the present invention.

FIG. 3 is a flowchart for explaining a method of removing an icon in a mobile terminal according to an embodiment of the present invention. FIG. 4 is a flowchart for restoring a removed icon in a mobile terminal according to an embodiment of the present invention.

As illustrated in FIG. 3, a display of the mobile terminal may be divided into an icon display area and a menu area. The icon display area may display an icon and the menu area may display an executing icon (S1). The icon may include a folder, a file, or a widget. A widget may refer to an executable program. The executing icon may include an icon for executing a program or a function, such as, a text message icon, a call icon, a telephone number icon, and an Internet icon.

An icon displayed in the icon display area may be selected in order to generate a preliminary removing signal (S2). The menu area may display a removing icon in response to the preliminary removing signal (S3).

The generation of the preliminary removing signal may be generated via various selection techniques, such as a touch and drag motion towards the menu area, or may be generated by a touch signal on the selected icon for a predetermined time period.

The selected icon is deleted when the selected icon is placed on the removing icon in the menu area (S4 and S5). The menu area may include a temporary removing icon and a permanent removing icon. Additionally, the selected icon does not have to be placed exactly over the removing icon and may be placed within a predetermined vicinity in order to execute the removal process.

A method for restoring a removed icon in a mobile terminal will be explained with reference to FIG. 4.

Figure 4:
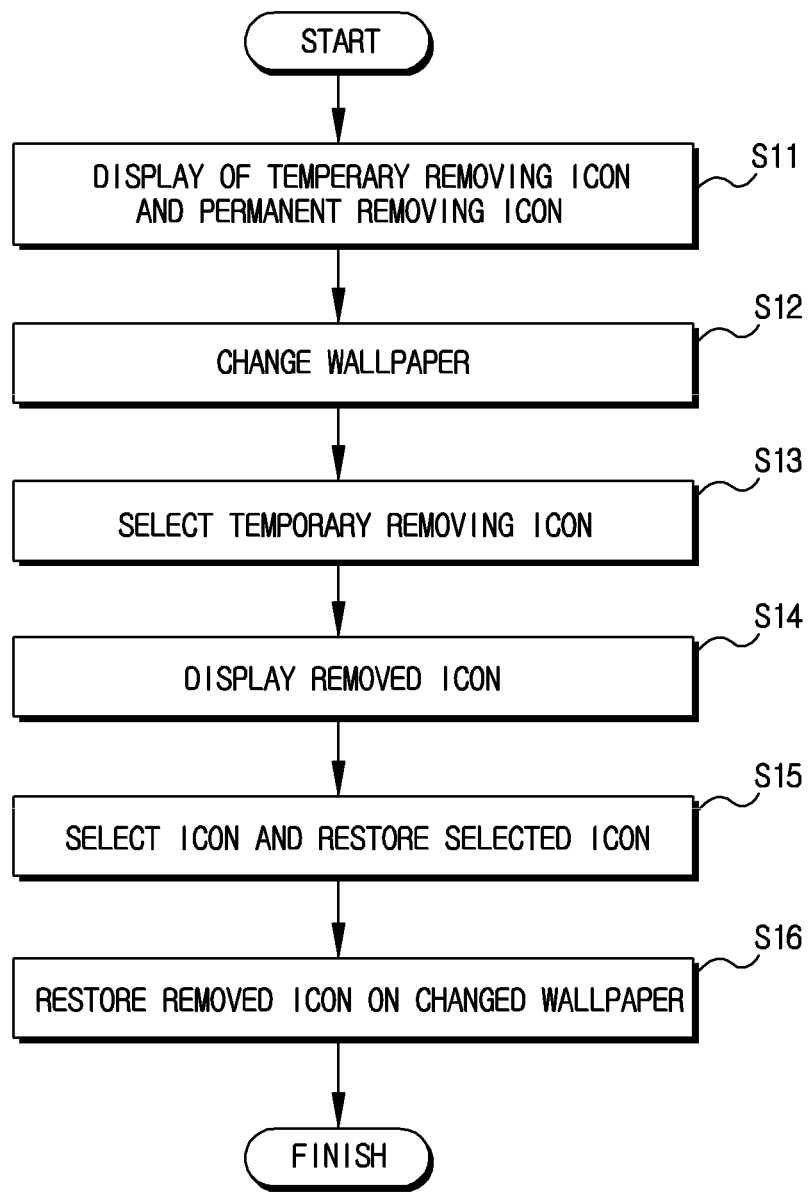
FIG. 4 is a flowchart for restoring a removed icon according to an embodiment of the present invention.

FIG. 4 is a flowchart for restoring a removed icon in a mobile terminal according to an embodiment of the present invention.

Referring to FIG. 4, if a user inputs a long touch input to the menu area in the display on the touch screen, the menu area may display a removing icon (S11). Although the present embodiment has described a long touch input to the menu area in order to display the removing icon, other methods for displaying the removing icon by one skilled in the art may be applied. The menu area may also display a temporary removing icon and a permanent removing icon.

Furthermore, the user may simply change the wallpaper via a flicking signal (S12), details of which will be explained with reference to FIG. 5.

If the temporary removing icon is displayed and selected (S13), the icon which was previously removed may be displayed on the display in the form of an icon or a list (S14). If at least one of the displayed icons is selected to generate a restoring command signal (S15), the selected icon is restored and displayed on the changed wallpaper. That is, the icon is not restored on the original wallpaper but the icon is restored on a screen currently displayed on the display.

Moreover, if the permanent removing icon is selected to restore a removed icon, the removed icon is restored on the original position, details of which will be explained with reference to FIG. 6.

A wallpaper application in which a method for restoring an icon and a method for removing an icon in a mobile terminal will be described in detail with reference to FIG. 5.

Figure 5:
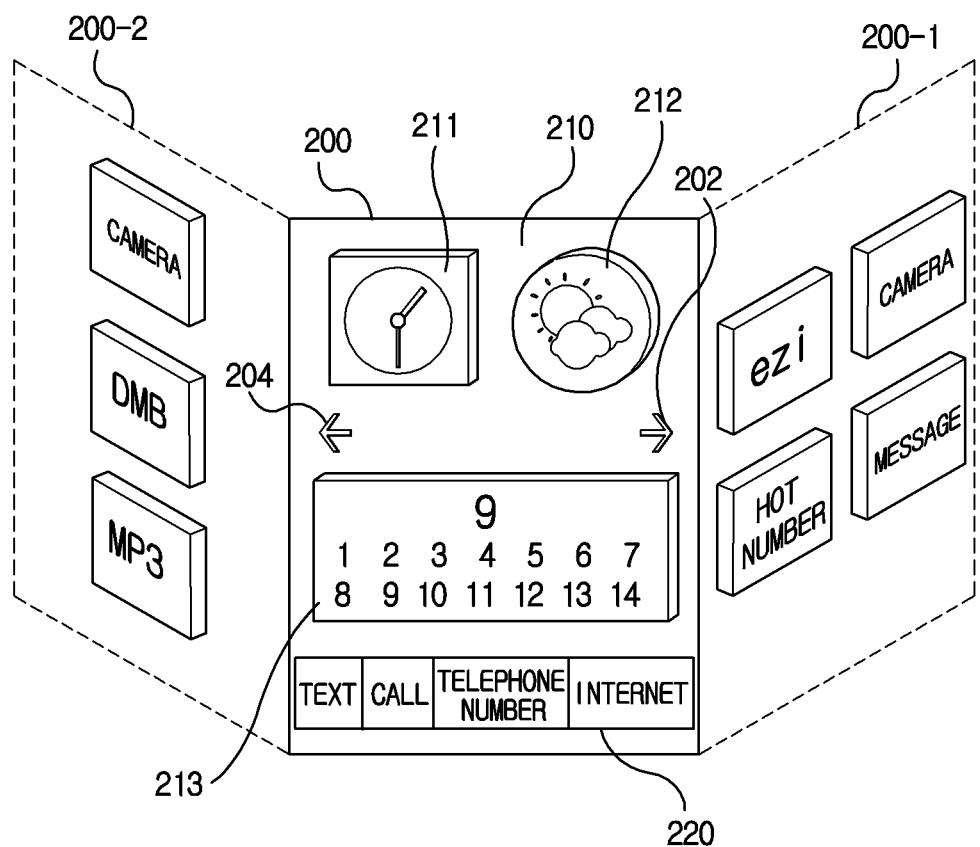
FIG. 5 is an image diagram for a wallpaper application applicable to a method for removing an icon in mobile terminal according to an embodiment of the present invention.

FIG. 5 illustrates a wallpaper application applicable to a method for removing an icon in mobile terminal according to an embodiment of the present invention.

A first wallpaper 200 may be displayed on the display of the mobile terminal 100. A second wallpaper 200-1 and a third wallpaper 200-2 may be arranged in virtual space adjacent to the first wallpaper. Specifically, the memory 160 may store a plurality of wallpapers, only one of which is displayed on the display.

As illustrated in FIG. 5, the first wallpaper 200 may include a display area 210 comprising a clock widget 211, a weather widget 212, and a calendar widget 213, and a menu area 220 displayed with executing icons comprising a text message icon, a call icon, a telephone number icon, and Internet icon.

As an example, if the user generates a wallpaper change signal for one direction, such as a right signal 202, the third wallpaper 200-2 is moved to the display and may replace the first wallpaper 200. Conversely, if the user generates a wallpaper change signal in another direction, such as a left signal 204, the second wallpaper 200-1 moves to the display to replace the first wallpaper 200.

As illustrated, the second wallpaper 200-1 may comprise an ez-i icon, a camera icon, a hot number icon, and a message icon, and the third wallpaper 200-2 may comprise a camera icon, a DMB icon, and an MP3 icon.

Furthermore, the first wallpaper, the second wallpaper, and the third wallpaper comprise a virtual three-dimensional (3D) space, such that the wallpaper may be changed in the same manner as a user's view is changed from a first surface to a second surface. According to the aforementioned wallpaper concept, the user can establish a plurality of wallpapers and easily change the wallpaper using a directional signal.

A method for removing an icon in mobile terminal will now be described in detail.

FIGS. 6A-6D illustrate a method for removing an icon in a mobile terminal according to an embodiment of the present invention. FIGS. 7A-7G illustrate a method for removing an icon in a mobile terminal and a method for storing the removed icon in a mobile terminal according to an embodiment of the present invention. FIGS. 8A and 8B illustrate a method for removing an icon in a mobile terminal according to an embodiment of the present invention.

Figure 6A:
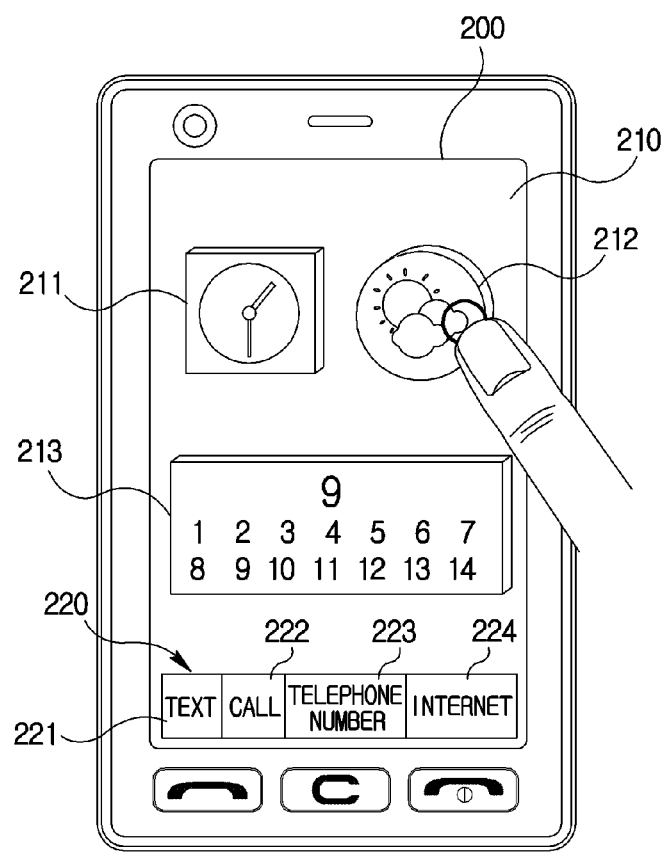
FIGS. 6A-6D illustrate removing an icon in a mobile terminal according to an embodiment of the present invention.

FIG. 6A illustrates a wallpaper 200 comprising an icon display area 210 and a menu area 220. Various icons, such as, a clock widget 211, a weather widget 212, and a calendar widget 213, may be displayed in the icon display area 210. Additionally, a menu area 220 may display various execution icons, such as, a text message icon 221, a call icon 222, a telephone number icon 223, and an Internet icon 224. The widget displayed on the display area 210 may be displayed as a tile-type icon or 3D icon.

Figure 6B:
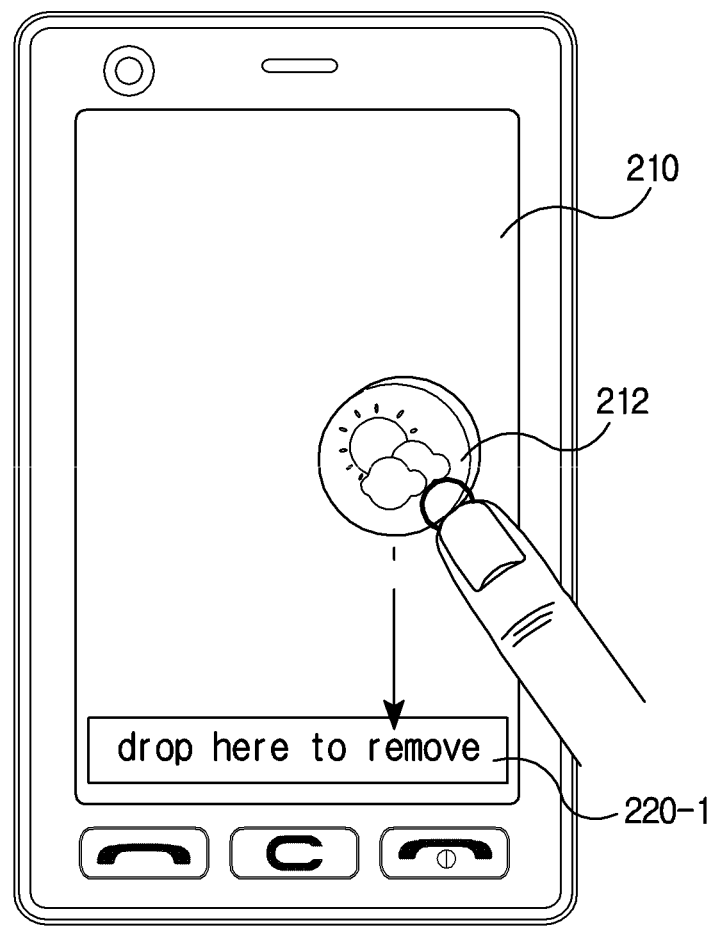

As an example, if the user selects the weather widget 212 and drags the weather widget 212 to the menu area 220, the menu area may change to a removing area 220-1. In other words, the icons displayed in the menu area 220 will now display a remove icon (FIG. 6B). The removing area refers to the remove icons displayed in the menu area. Furthermore, if a touch for a predetermined time period is input to the weather widget 212, the menu area may change to the removing area. Thus, if the menu area 220 is changed to the removing area 220-1, the widgets which were not selected would be temporarily removed from the icon display area 210.

Figure 6C:
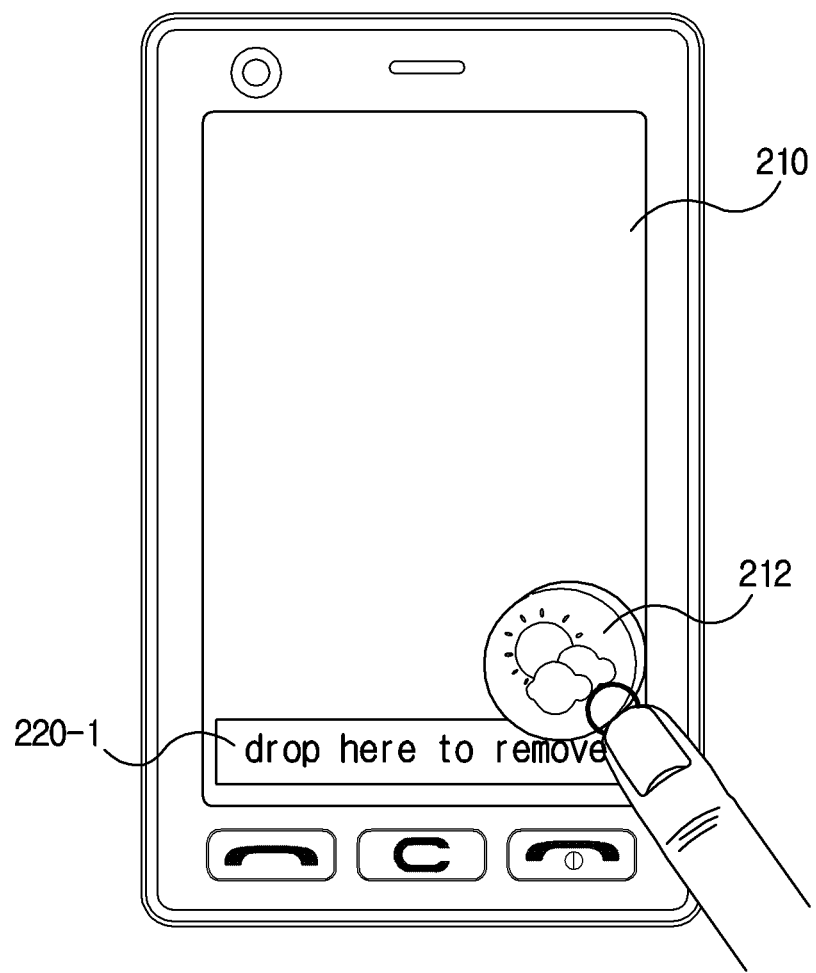
Figure 6D:
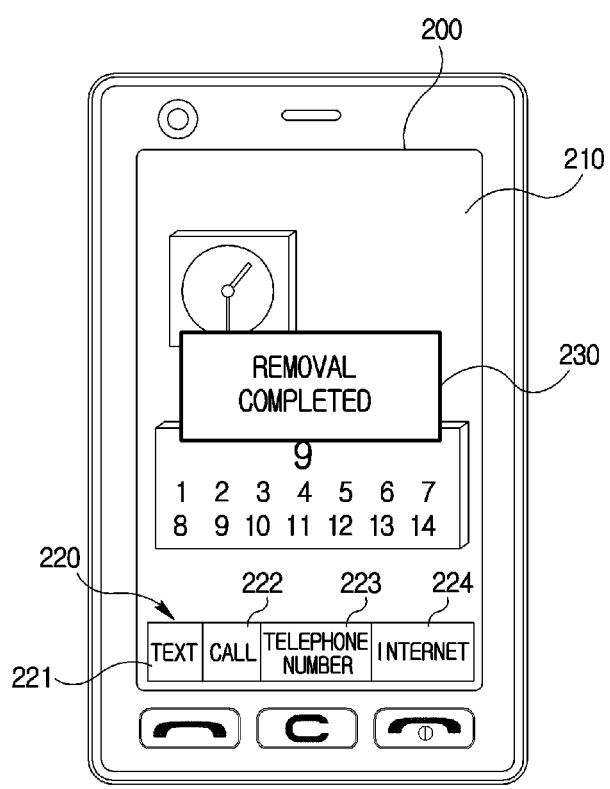

Additionally, the controller 180 may delete the weather widget 212 if the weather widget 212 dragged to a predetermined vicinity of the removing area, such as the border (FIG. 6C). As a result of the removal, a removal completion message 230 may be displayed as shown in FIG. 6D. Furthermore, the removing area may change to the menu area 220, and the icons which were temporarily removed, may once again be displayed.

Although the present example has described a method for removing an icon on the wallpaper, examples are not limited thereto, and a method for removing the icon in the conventional menu screen may be applied. For example, a method for removing at least one file on a file list screen may be applied. Furthermore, although the present example has exemplified removal of a widget, it should be apparent that the example may be used for removing icons, a message, a file, a telephone number, a folder, and the like.

FIGS. 7A-7G illustrate a method for removing an icon in a mobile terminal and a method for storing the removed icon in a mobile terminal according to an embodiment of the present invention.

Figure 7A:
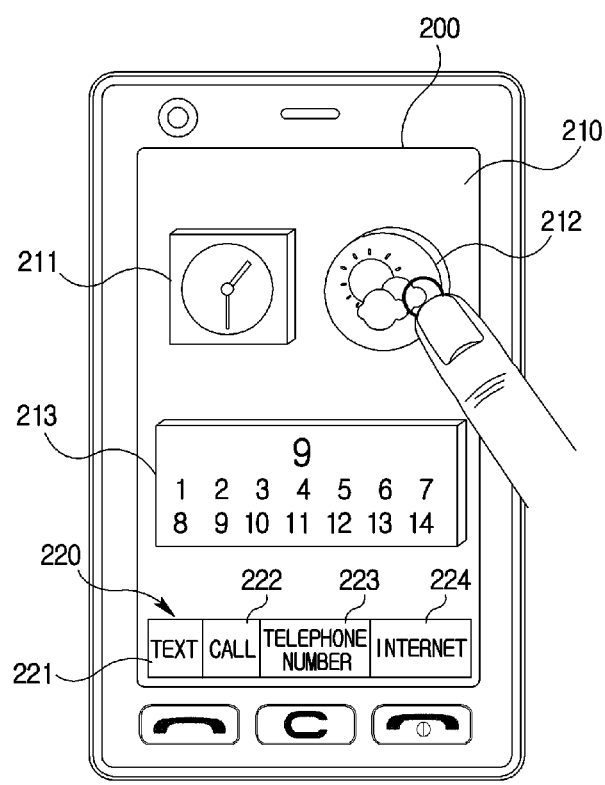
FIGS. 7A-7G illustrate removing an icon in a mobile terminal and for storing the removed icon executing a menu in a mobile terminal according to an embodiment of the present invention.
Figure 8A:
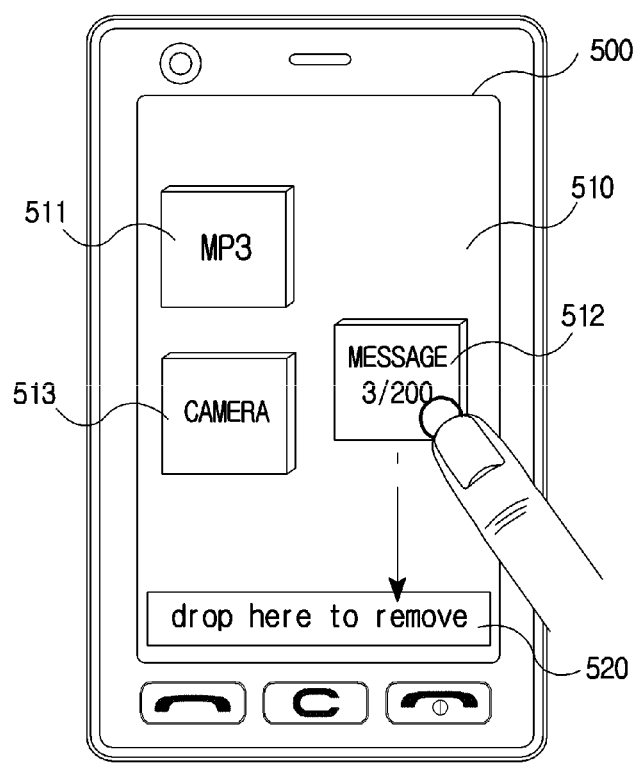
FIGS. 8A and 8B illustrate removing an icon in a mobile terminal according to an embodiment of the present invention.
Figure 8B:
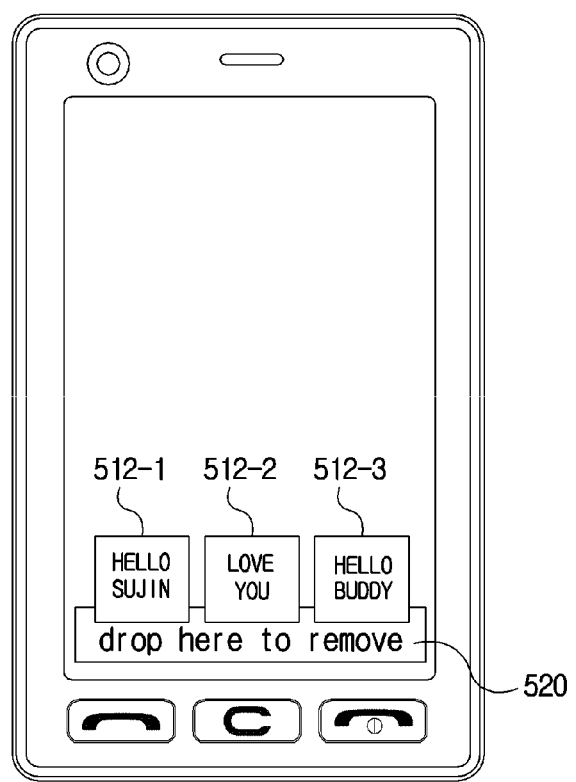

FIG. 7A illustrates the wallpaper 200, which may comprise an icon display area 210 and a menu area 220. The icon display area 210 may display widgets, such as, a clock widget 211, a weather widget 212, and a calendar widget 213. The menu area 220 may display an executing icon, such as a text message icon 221, a call icon 222, a telephone number icon 223, and an Internet icon 224.

Figure 7B:
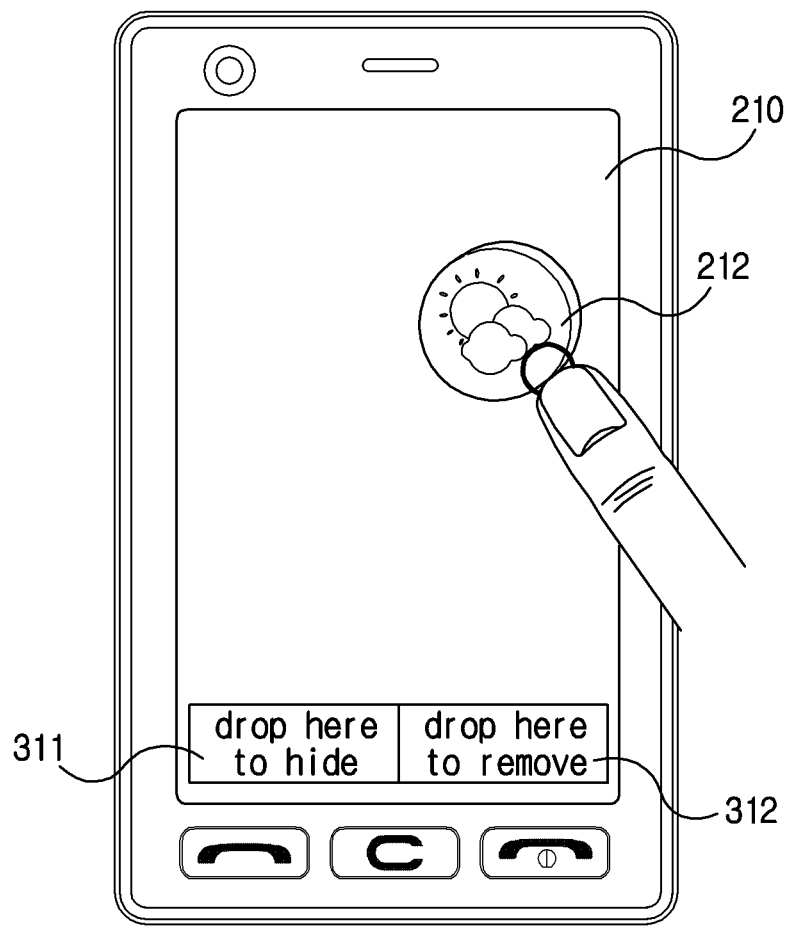

In one example, if the user selects the weather widget 212 and drags the weather widget 212 toward the menu area 220, the menu area 220 may change to a temporary removing area 311 and a permanent removing area 312 as illustrated in FIG. 7B.

In another example, if a touch is input on the weather widget 212 for a predetermined period of time, the menu area 220 may change to the temporary removing area 311 and the permanent removing area 312. Thus, widgets other than the selected weather widget 212 may be removed from the display if the menu area 220 is changed to the temporary removing area 311 and the permanent removing area 312.

Figure 7C:
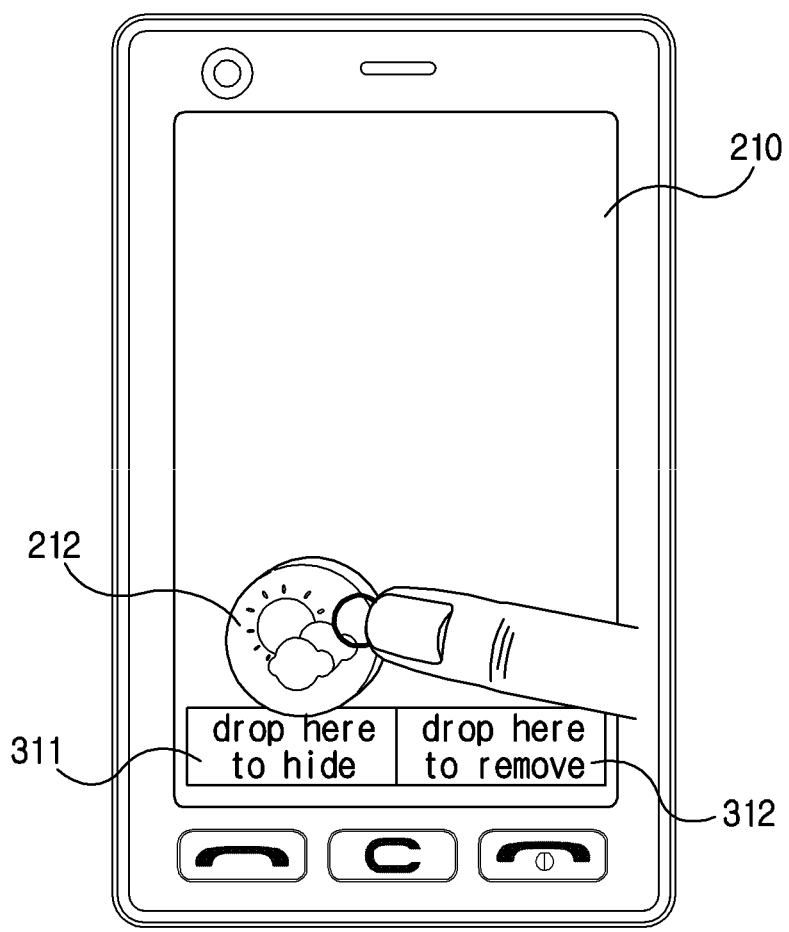

Additionally, the controller 180 may temporarily delete the weather widget 212 if the weather widget 212 is moved to a predetermined vicinity of the temporary removing area 311, such as the border on the temporary removing area 311 (FIG. 7C). As a result of the removal, a removal completion message (not shown) may be displayed on the display. Furthermore, after the removal is complete, the removing area may change back to the menu area 220, and the icons, which were temporarily removed from the display are, may be displayed again (not shown).

Figure 7D:
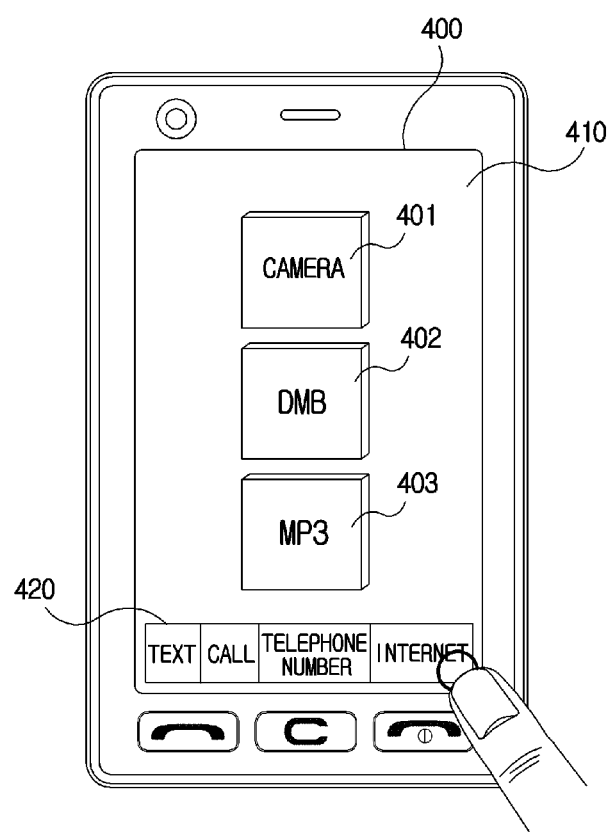

FIG. 7D illustrates a second wallpaper 400 (similar to the third wallpaper 200-2 of FIG. 5). The wallpaper 400 may include an icon display area 410 and a menu area 420. The icon display area may display icons, such as, a camera icon 401, a DMB icon 402, and an MP3 icon 403. The menu area 420 may display executing icons, such as, a text message icon, a call icon, a telephone number icon, and an Internet icon.

Figure 7E:
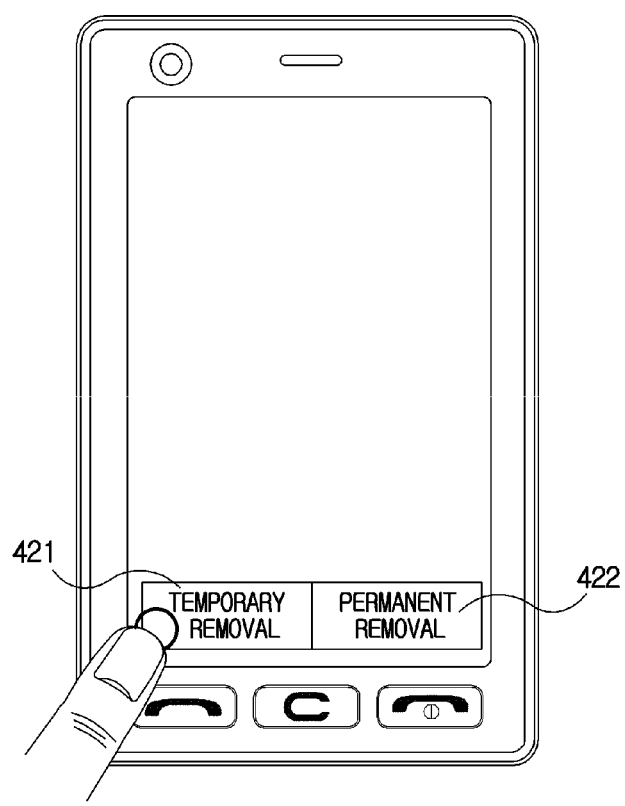
Figure 7F:
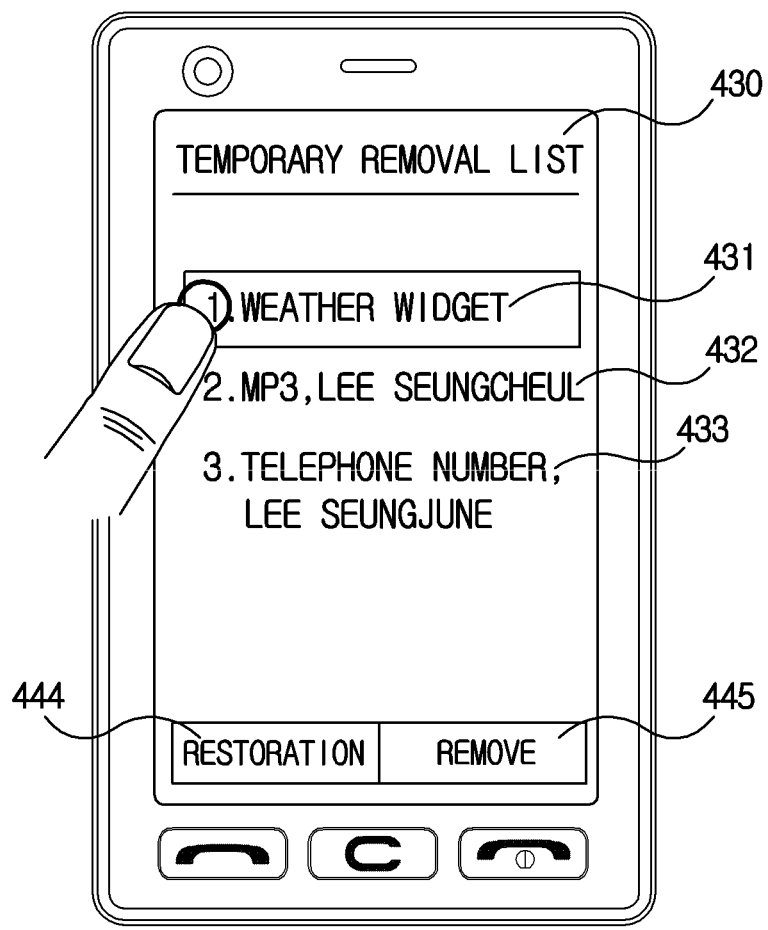
Figure 7G:
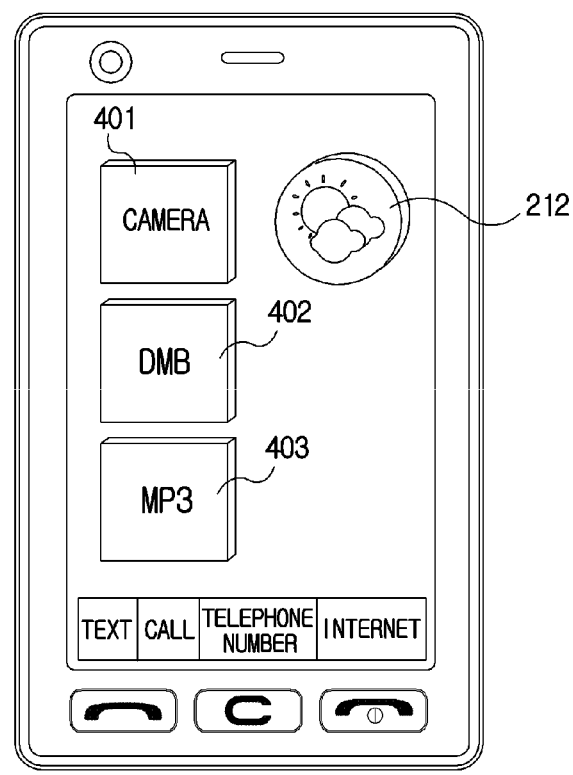

As an example, if a touch, for a predetermined time period, is input to the menu area 420, the menu area 420 may be changed to a temporary removing area 421 and a permanent removing area 422 (FIG. 7E). The icons displayed on the icon display area 410 may be removed when the menu area 420 changes to a temporary removing area 421 and a permanent removing area 422 (FIG. 7E). In this example, a temporary removing list screen 430 may be displayed on the display (FIG. 7F) if the temporary removing area 421 is selected. The temporary removing list screen 430 may include temporarily removed items 431-433, a restoration icon 444 and a permanent removal icon 445.

After the user selects an item from the list of temporarily removed items, such as the weather widget item 431, the user may then select either the restoration icon 444 or the permanent removal icon 445. For example, the weather widget icon 212 would subsequently be displayed on the second wallpaper (FIG. 7G) if the user selects the restoration icon 444. The temporarily removed icon is restored on the wallpaper currently displayed, as opposed to the wallpaper which originally displayed the icon.

Conversely, a permanent removing list is displayed on the display 151 if the permanent removing area 422 is selected. However, the restored icon will be restored to the wallpaper which originally displayed the icon.

FIGS. 8A and 8B illustrate a method for removing an icon in a mobile terminal according to an embodiment of the present invention.

FIG. 8A illustrates a wallpaper 500 which may include an icon display area 510 and a menu area. The icon display area may display icons, such as, an MP3 icon 511, a message folder 512, and a camera icon 513. The menu area may display an executing icon (not shown).

As an example, if the user selects the message folder 512 and drags the message folder 512 towards the menu area, the menu area may change to the removing area 520. Moreover, the other icons displayed on the wallpaper 500 may be removed when the removing area 520 is displayed (not shown).

Moreover, if the user drags the message folder 512 to a predetermined vicinity of the removing area 520, such as the border, a plurality of files within the message folder may be removed. Additionally, preview screens 512-1, 512-2, 512-3 of the message to be removed may be displayed and subsequently removed (FIG. 8B)

Although the third example has described text message removal, it should be apparent that the example may be applied to any folder. According to the example, if the user removes the folder, the user can check the files to be removed within the folder.

Changing of the menu area is not limited to a display of a removal area which displays removal icons. In an alternate embodiment, functional icons may be displayed in the menu area in response to the selection of an icon, file, or folder.

For example, various icons associated with different file types, such as a music file, a movie file, or an image file, may be displayed in the icon display area (not shown). When the user selects an icon and performs an input for a predetermined period of time, the menu area may change to display icons associated with programs that may execute the selected file type.

According to the current example, if a user selects an MP3 file and performs an input for a predetermined period of time, the menu area may change to display various programs which may play an MP3 file, such as iTunes, WinAmp, and Windows Media Player. In another example, if a movie file is selected and an input is performed for a predetermined period of time, the menu area may change to display program which may play a movie file, such as QuickTime and Windows Media Player.

The embodiments disclosed above provide examples of a touch and drag operation performed on a selected icon, wherein the selected icon is dragged towards the menu area. In another embodiment of the present invention, an icon may be visually altered when selected and provide additional information when dragged to a predetermined vicinity of the menu area.

For example, an icon display area may display a weather icon and a clock icon, similar to FIG. 6A. If a user selects an icon, such as the weather icon, and performs an input for a predetermined period of time, the icon may be altered in appearance. For example, the icon may increase or decrease in size, change in color, or be highlighted. While the selected icon is dragged towards the menu area, the change of appearance is maintained. Once the selected icon is dragged to within a predetermined vicinity of the menu area, such as the border of an icon displayed in the menu area, additional information pertaining to the selected icon may be displayed. For example, weather information, such as current temperature and current conditions may be displayed if the selected icon is the weather icon. The embodiment described above is not limited to an icon and may be utilized with any item displayed in the icon display area, such as a file or a folder.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for removing an icon in a mobile terminal, the method comprising:
    displaying an icon display area and a menu area on a display screen of the mobile terminal, wherein a plurality of icons is displayed in the icon display area and a plurality of menus is displayed in the menu area;
    receiving a first touch input on an icon to be removed among the plurality of icons for a predetermined period of time;
    changing at least a portion of the displayed menu area to a removing area while receiving the first touch input;
    temporarily removing the plurality of icons except for the touched icon in the icon display area while displaying the removing area;
    receiving a drag input of the touched icon to the removing area;
    removing the touched icon from the icon display area; and
    displaying the plurality of icons except for the removed icon in the icon display area and re-displaying the menu area without the removing area after the removal of the touched icon.

2. The method of claim 1, further comprising:
    displaying a first wallpaper in the icon display area.

3. The method of claim 1, wherein the touched icon includes a folder comprising a plurality of files, the method further comprising:
    displaying a preview of at least one file of the plurality of files prior to the removal of the touched icon.

4. The method of claim 2, further comprising:
    setting at least a second wallpaper or a third wallpaper in a virtual space adjacent to the first wallpaper and changing the first wallpaper to the second wallpaper or third wallpaper in response to a wallpaper changing signal.

5. The method of claim 4, wherein the removing area comprises a temporary removing area and a permanent removing area.

6. The method of claim 5, further comprising:
    displaying a list of temporarily removed icons when a second touch input is received on the temporary removing area;
    receiving a third touch input on a removed icon in the list of temporarily removed icons; and
    displaying the removed icon on a currently displayed wallpaper.

7. A mobile terminal, comprising:
    a touch screen configured to display an icon display area and a menu area, wherein a plurality of icons is displayed in the icon display area and a plurality of menus is displayed in the menu area; and
    a controller configured to:
        control the touch screen to change at least a portion of the displayed menu area to a removing area and to temporarily remove the plurality of icons except for an icon to be removed from the icon display area when a first touch input is received on the icon of the plurality of icons for a predetermined period of time,
        remove the touched icon from the icon display area when a drag input is received on the touched icon to the removing area, and
        control the touch screen to display the plurality of icons except for the removed icon in the icon display area and to re-display the menu area without the removing area after the removal of the touched icon.

8. The mobile terminal of claim 7, wherein the controller is further configured to remove the touched icon when the touched icon is dragged to a position proximate the removing area.

9. The mobile terminal of claim 7, wherein the touched icon is associated with an executable program, a file, or a folder.

10. The mobile terminal of claim 9, wherein:
    the touched icon includes a folder comprising a plurality of files; and
    the controller is further configured to control the touch screen to display a preview of at least one file of the plurality of files prior to the removal of the icon.

11. The mobile terminal of claim 7, wherein the removing area comprises a temporary removing area and a permanent removing area.

12. The mobile terminal of claim 11, wherein the controller is further configured to:
   control the touch screen to display a list of temporarily removed icons when a second touch input is received on the temporary removing area;
   recognize receipt of a third touch input on a removed icon in the list of temporarily removed icons; and
   control the touch screen to display the removed icon on a currently displayed wallpaper.

13. The method of claim 1, wherein receiving the drag input of the touched icon to the removing area comprises the touched icon being dragged to a position overlapping the removing area.

14. The method of claim 1, wherein receiving the drag input of the touched icon to the removing area comprises the touched icon being dragged to a position proximate the removing area.

15. The mobile terminal of claim 7, wherein the controller is further configured to remove the touched icon when the touched icon is dragged to a position overlapping the removing area.

16. The method of claim 1, wherein the plurality of icons except for the touch icon is not displayed while the drag input is received.

17. The method of claim 1, wherein the at least a portion of the display area is not changed to the removing area while receiving the first touch input until the predetermined period of time is reached.

18. The method of claim 1, further comprising:
   performing a function associated with the icon if the first touch input is received less than the predetermined period of time.

19. The method of claim 1, wherein the predetermined period of time is a period of time that is longer than a threshold period of time.

* * * * *